United States Patent

[11] 3,567,873

[72] Inventor Bruno Peroni
Rome, Italy
[21] Appl. No. 692,783
[22] Filed Dec. 22, 1967
[45] Patented Mar. 2, 1971
[73] Assignees Consiglio Nazionale delle Ricerche
P. le delle Scienze, ;
Fondazione U. Bordoni
Rome, Italy
[32] Priority Dec. 24, 1966, May 27, 1967
[33] Italy
[31] 43785 and 37064

[54] ECHO-SUPPRESSION AND NOISE-ELIMINATION SYSTEM FOR TELEPHONE CIRCUITS
9 Claims, 5 Drawing Figs.

[52] U.S. Cl. .......... 179/170.2
[51] Int. Cl. .......... H04b 3/24
[50] Field of Search .......... 179/170.2, 170.8

[56] References Cited
UNITED STATES PATENTS 2,167,007 7/1939 Schott et al. .......... 179/170.8
3,106,679 10/1963 Friedrich .......... 325/2
3,175,051 3/1965 Cutler .......... 179/170.2
3,351,720 11/1967 Brady .......... 179/170.2

*Primary Examiner*—Kathleen H. Claffy
*Assistant Examiner*—William A. Helvestine
*Attorney*—Karl F. Ross ABSTRACT: An incoming and an outgoing telephone channel, connected to a local line via a hybrid coil, are each provided with a multiplicity of parallel branch paths including respective band-pass filters selecting different subbands in a band of voice frequencies to be transmitted or received, the filters of each channel being in series with respective relay contacts so controlled in response to incoming voice signals that subbands whose frequencies predominate in the incoming signal are selectively received by the local line while being blocked in the outgoing channel for the suppression of echoes. The selective opening of some relay contacts may be limited to periods of two-way communication, with the aid of a monitoring circuit responding to the concurrent presence of different frequencies in the two channels; alternatively, the monitoring circuit may be responsive to a single pilot frequency which is suppressed at the receiving side of the hybrid coil so that its presence in the outgoing channel can be due only to a voice signal originating at the local station.

Bruno Peroni
INVENTOR.

BY Karl F. Ross
Attorney

Bruno Peroni
INVENTOR.
BY Karl F. Ross
Attorney

Bruno Peroni
INVENTOR.

BY Karl F. Ross
Attorney

Bruno Peroni
*INVENTOR.*

BY Karl F. Ross
Attorney

ECHO-SUPPRESSION AND NOISE-ELIMINATION SYSTEM FOR TELEPHONE CIRCUITS

At the intervals of time in which a user is speaking, presently used echo suppressors introduce a high attenuation in the line bringing the echo back to the user. It is unavoidable that, in addition to damping the speaker's echo, the attenuation thus introduced will also block the words uttered by the responder on joining in the conversation. To overcome this drawback, the more advanced suppressors comprise devices switching off the attenuator when the second user is joining in the conversation; however, such devices operate only if the intensity of the voice signal of the responder exceeds, in the echo suppressor that of the original speakers's signal. Moreover, the release device does not always operate, in view of the substantial level differences of phonic signals.

In order to improve the transmission quality when echo is present, it has been suggested to take advantage of the fact that in the frequency band of 300 to 3400 Hz., as used in telephone, the vocal energy is not evenly distributed with respect to frequency but is concentrated in frequency subbands separated by further subbands in which the state of energy is very low. The location of the high-energy and low-energy subbands remains unchanged for time-intervals having a duration within the range of a few hundredths to a few tenths of a second, but changes from one interval to the next.

In the device according to the present invention the uneven distribution for the voice-energy intensity with respect to frequency is utilized for suppressing the speaker's echo without completely precluding the passage of the interlocutor's voice. This is achieved by connecting a selective echo attenuator in the return channel or circuit, said attenuator only attenuating the signal components in the subbands utilized by the speaker's voice, the echo of which is to be blocked, and allowing free passage in the frequency subbands not utilized by the speaker. Generally, the latter succeeds in perceiving or understanding the interlocutor since human hearing is capable of rebuilding a phonic signal even in the absence of the components in some subbands.

In other terms, during the time-intervals in which both telephone users are speaking, the selective attenuators suppressing echo return are controlled by selective detectors to which the vocal signal of one of the two users is applied, while the vocal signal of the other user carried on the momentarily unattenuated subbands passes freely over the line. By this principle, the vocal signal controlling the echo suppressor traverses the suppressor in an almost unaltered state, while the vocal signal not controlling said suppressor is subjected to a substantial degradation.

An improvement upon this approach consists in similarly processing the two vocal signals during the intervals of two-way conversation by allocating predetermined voice-frequency subbands to the two speakers.

With proper subdivision of the phonic band into two sets of transmission subbands, to be respectively allotted to is suitably accomplished the two vocal signals, is suitably accomplished, and as long as the not attenuation of each filter is not just sufficient for reducing the echo to tolerable levels but is not excessive beyond its assigned subband, none of the two vocal signals is subjected to degradations compromising comprehensibility.

It is advantageous to connect an amplifier in each transmission channel along with the attenuating filters for some subbands, or to increase the gain of existing amplifiers in each transmission channel, so as to compensate for the total signal attenuation caused by the filters.

Figure 1:
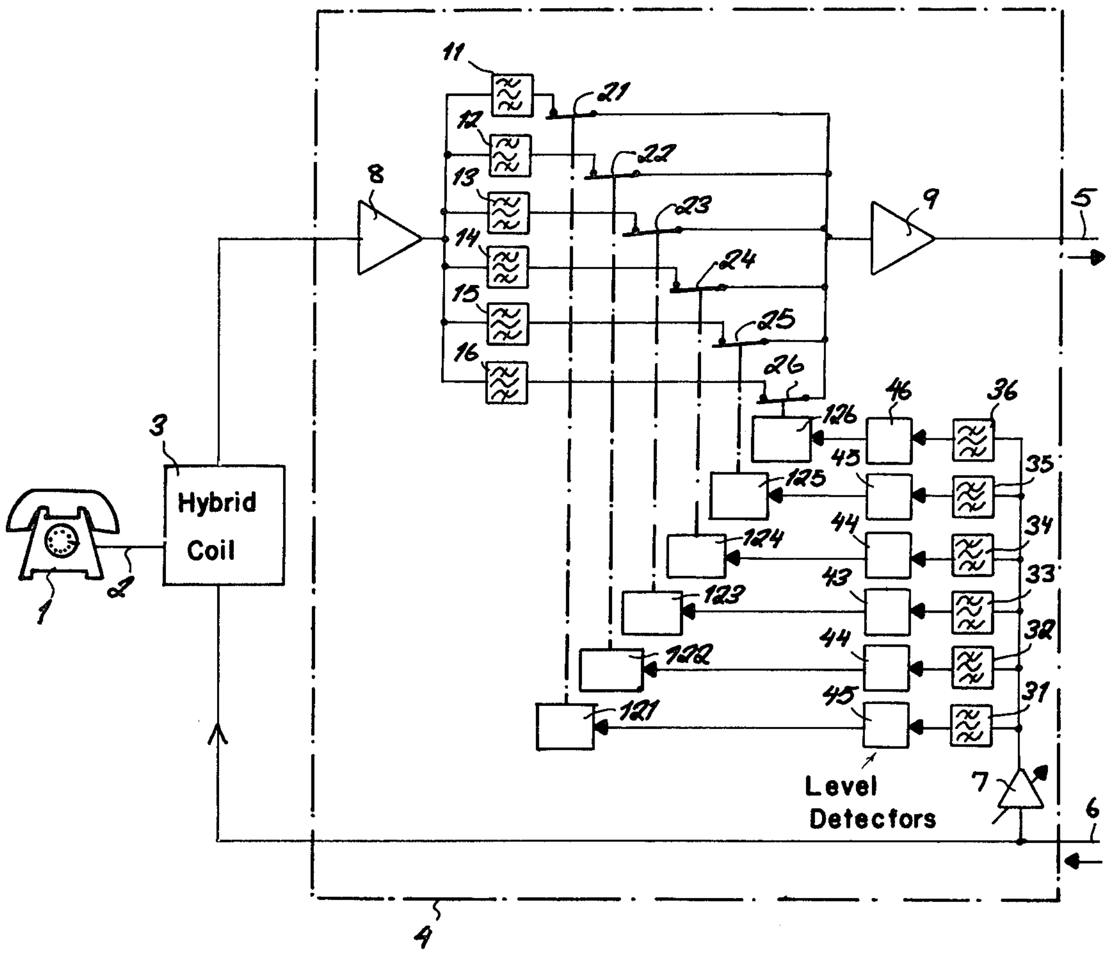
FIG. 1 is a circuit diagram of a selective echo-suppressing device in a telephone circuit embodying my invention.

In FIG. 1 I have shown a handset 1 for the user adjacent the suppressor, a two-wire circuit 2 connecting handset 1 to a hybrid coil 3 associated with handset 1, an echo suppressor 4 adjacent handset 1, and two channels 5, 6 constituting a four-wire line between hybrid coil 3 and a similar hybrid coil, not shown, at the far end of the line.

An identical echo suppressor is connected at the other line terminal serving a second subscriber.

The system further includes an amplifier with automatic gain control, as well as two adjustable-gain amplifiers 8, 9.

Band-pass filters 11, 12, 13, 14, 15, 16 are connected in parallel to the output of amplifier 8 and are respectively assigned to adjoining subbands extending from 300 to 3400 Hz. The number of six subbands shown has been chosen only by way of example.

A set of relays 121, 122, 123, 124, 125, 126 are provided with respective break contacts 21, 22, 23, 24, 25, 26.

Band-pass filters 31, 32, 33, 34, 35, 36, similar to filters 11, 12, 13, 14, 15, 16, are connected in parallel to the output of amplifier 7 and work into level detectors 41, 42, 43, 44, 45, 46 which operate the relays 121, 122, 123, 124, 125, 126 respectively.

When the vocal signal of the remote party or responder reaches suppressor 4 via channel 6, a portion thereof is deviated to amplifier 7 for analysis purposes. The output signal of amplifier 7 is applied in parallel to the six band-pass filters 31, 32, 33, 34, 35, 36 feeding the detectors 41—46.

Thus, there are energized at every instant the relays assigned to the frequency subbands in which the energy of the vocal signal of the responder is concentrated.

The energized relays open the break contacts 21, 22, 23, 24, 25, 26, each of which is in series with one of the six parallel branch channels into which the return path 5 has been divided.

Since the incoming voice signal has a frequency distribution which is characteristic of the responder, the echo thereof generated in hybrid coil 3 and the local two-wire circuit 2 finds its way to the outgoing channel 5 blocked by the open relay contacts. When the user adjacent suppressor 4 is speaking through handset 1, the resulting voice signal will generally have a frequency distribution more or less different from that of the signal from the remote terminal and will pass at through the filters connected to whatever relay happen to be contacts of the deenergized.

Figure 2:
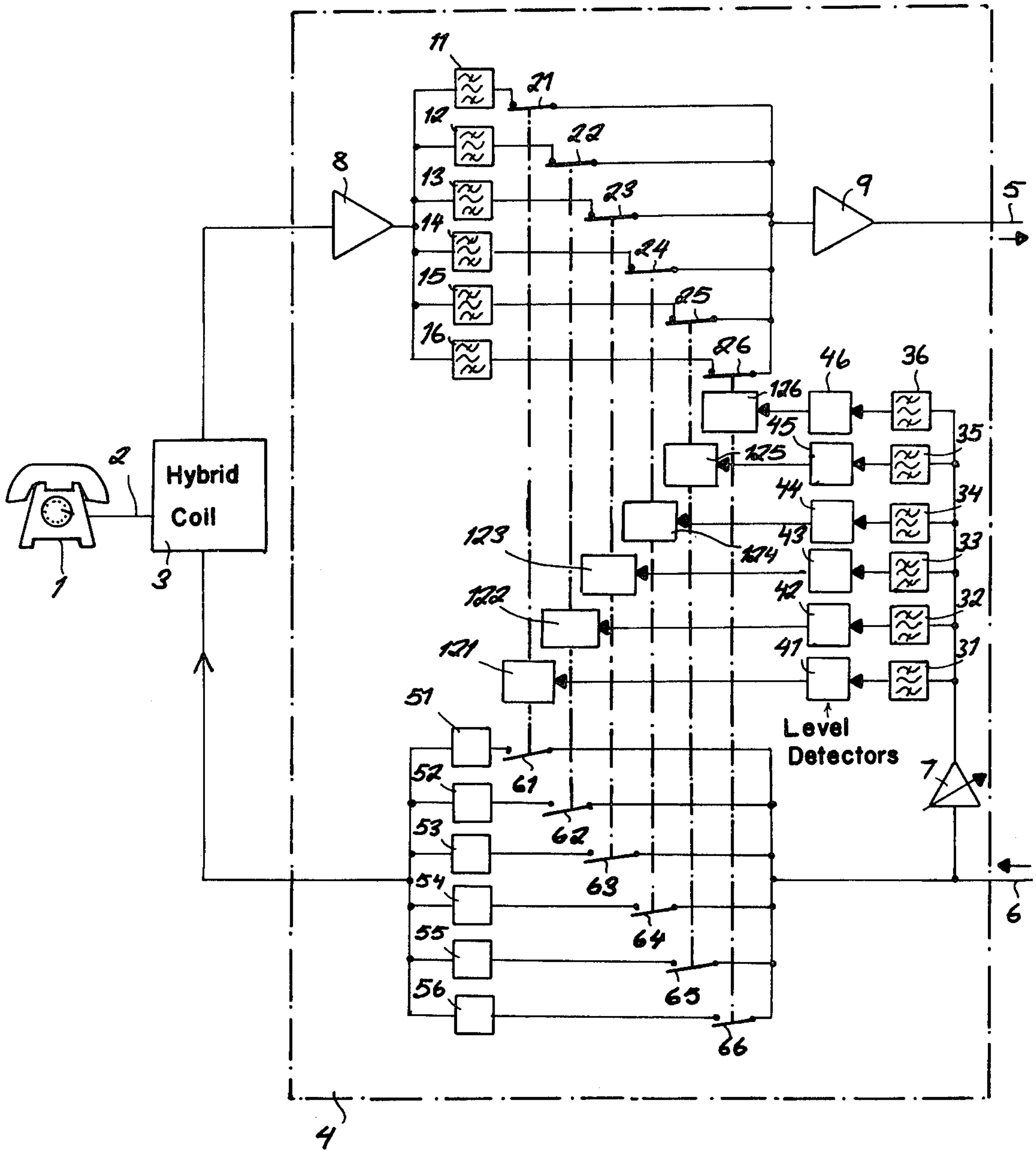
FIG. 2 is a diagram similar to that of FIG. 1 showing further band-pass filters connected in the line from the second speaker.

In the suppressor just described and shown in FIG. 1, it may occur that echoes of low-energy frequency components of the responder's voice signal, of a level insufficient to energize the corresponding relays pass through the closed contacts and return to the remote terminal. Although the echo level is very low in this case, full suppression thereof can be realized by modifying the diagram of FIG. 1 as shown by way of example in FIG. 2, in which all of the elements designated from 1 to 46 are the same as those of FIG. 1, and which shows an additional set of band-pass filters 51, 52, 53, 54, 55, 56 similar to filters 11, 12, 13, 14, 15, 16, the relays 121—126 having additional make contacts 61, 62, 63, 64, 65, 66 connected in series with filters 51—56 in parallel branch channels between incoming path 6 and the receiving side of coupling network 3.

Each of the contacts 61, 62, 63, 64, 65, 66 closes when sufficient energy is present in the subband selected by the filter 41—46 connected to the corresponding relay 121—126.

In addition to blocking the responder's echo, the filters 51—56 are also effective in suppressing the noise superposed on the responder's voice signal in the subbands in which the level of the incoming signal is so low that it will not actuate the corresponding relay.

The selective attenuators comprising filters 51, 52, 53, 54, 55, 56 and contacts 61, 62, 63, 64, 65, 66, operated by level detectors 41, 42, 43, 44, 45, 46, may be used to reduce the accompanying noise, also separately from the selective attenuators 11—16 and 21—26, sewing for echo suppression, in circuits affected by noise but not by echo.

In come circumstances it may be advantageous to interpose between the relays 121—126 and the detectors 41—42 a logic network adapted to control these relays according to predetermined criteria in conformity with the characteristics of the vocal and nonvocal signals which may be going through the circuit.

Figure 3:
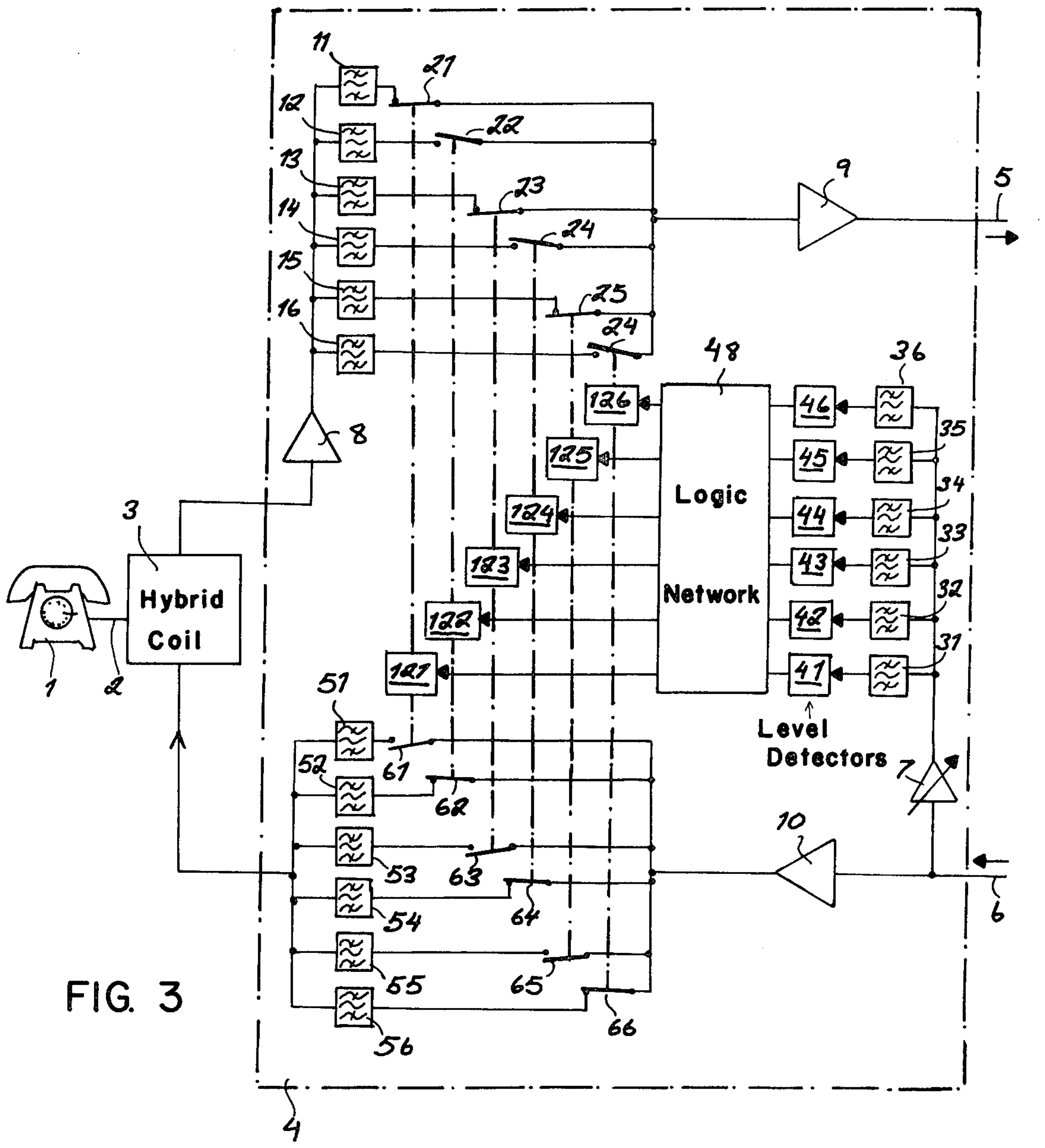
FIG. 3 is a diagram similar to the preceding diagrams, showing frequency-distributing means for allocating respective groups of subbands to an outgoing and an incoming channel during the intervals of two-way conversation, and an identifying device for detecting the existence of such two-way conversation.

By way of example, there is shown in FIG. 3 an arrangement of relay contacts 21—26 and 61—66 serving to distribute the transmitted frequency subbands during periods of two-way conversation.

In this embodiment there is provided in path 6 a further amplifier 10 whose gain, like that of amplifier 8, increases during intervals of two-way conversation. Additionally, there is provided a logic circuit 48 whose function will be described hereinafter and through which the detecting devices 41—46 supply the relays 121—126. The system is otherwise similar to that of FIG. 2.

In FIG. 3, contacts 21, 23, 25, 62, 64, 66 are closed while contacts 22, 24, 26, 61, 63, 65 are open. Thus, the subbands of filters 11, 13, 15 (corresponding to those of filters 51, 53 and 55) are transmitted over outgoing line 5 and attenuated in the signal arriving over incoming line 6 on the other hand, the subbands of filters 12, 14, 16 (corresponding to those of filters 52, 54, 56) are received over incoming line 6 at station 1 and are attenuated on transmission over line 5.

Under the indicated circumstances, each party receives the other's voice signal attenuated only in half the subbands, and receives an attenuated echo in all the subbands.

In order to allot all the subbands to the talking party during one-way transmission and half the subbands to each party during periods of two-way communication, means must be provided for detecting the simultaneous presence of the signals emitted by the speakers without mistaking the echo of one speaker's voice for a signal emitted by the other speaker.

This is accomplished by concentrating in certain subbands the power of a phonic signal, as mentioned at the beginning of the present specification. Since the distribution of power averaged over a short period is different for the two signals, while being identical for a signal and the echo thereof, it will suffice for detecting the simultaneous presence of signals as emitted by the two speakers to provide a device monitoring the difference, if any, in the frequency distribution of the signals concurrently present on the two transmission channels of the four-wire line.

The aforedescribed selective echo suppressor already contains most of the circuit elements required for monitoring two-way conversation by means of the disclosed principle. Thus, it will be noted that no echo signals are present in the output of amplifier 9, and therefore the existence of a vocal signal in that output is necessarily due to the vocal emission of a speaker at station 1, and more particularly to those components of that vocal emission which are not blocked by the momentarily open switches (such as contacts 22, 24, 26).

Therefore, it will suffice to detect in a circuit 47 of FIG. 3 the presence of a signal in the output of amplifier 9 and to employ the logic circuit 48 for ascertaining the simultaneous existence of voltage at the outlets of detector 47 and of one or more of detectors 41, 42, 43, 44, 45, 46.

Such a monitoring circuit can be substantially simplified and realized even independently of the remainder of the selective echo suppressor if it is permissible that the signals received by each speaker be deprived of the frequency components within a narrow subband. In this case, a difference in the frequency distribution between incoming and outgoing signals can be artificially introduced by two band-stop filters respectively connected in the two channels of the four-wire circuit.

Figure 4:
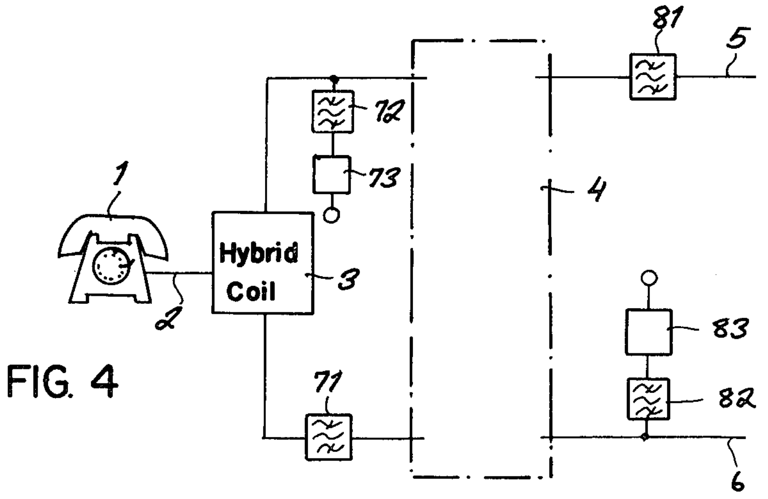
FIG. 4 shows a general echo suppressor comprising simplified identifying devices in its circuit for detecting two-way conversation.

In FIG. 4 there is shown by way of example an echo suppressor provided with such monitoring means for ascertaining the condition of two-way conversation in a system otherwise corresponding to that of FIG. 3.

FIG. 4 additionally shows a band-stop filter 71 on the receiving side of coupling network 3 attenuating the components within a narrow subband centered on a predetermined frequency $f_i$; a band-pass filter 72 is connected to channel 5 ahead of echo suppressor 4 to select the center frequency $f_i$, removed by filter 71 from the incoming signal, for transmission to a detector 73. Beyond echo suppressor 4, a band-stop filter 81 in outgoing channel 5 attenuates the same components centered on a predetermined frequency $f_j$; another band-pass filter 82 is connected to channel 6 ahead of network 4 to select the frequency components removed by filter 81 which, if present, can therefore originate only from a talker at the remote station and which are picked up by a detector 83.

The outputs of detectors 73 and 83 are supplied to a logic circuit, not shown, indicating whether either parties, or both are speaking.

Since in all the aforedescribed embodiments the frequency subbands are transmitted over one channel I can simplify the circuits by providing when attenuated on the other channel, a single set of filters, such as band-pass filters, being adapted to be alternately connected in one or the other channel.

Figure 5:
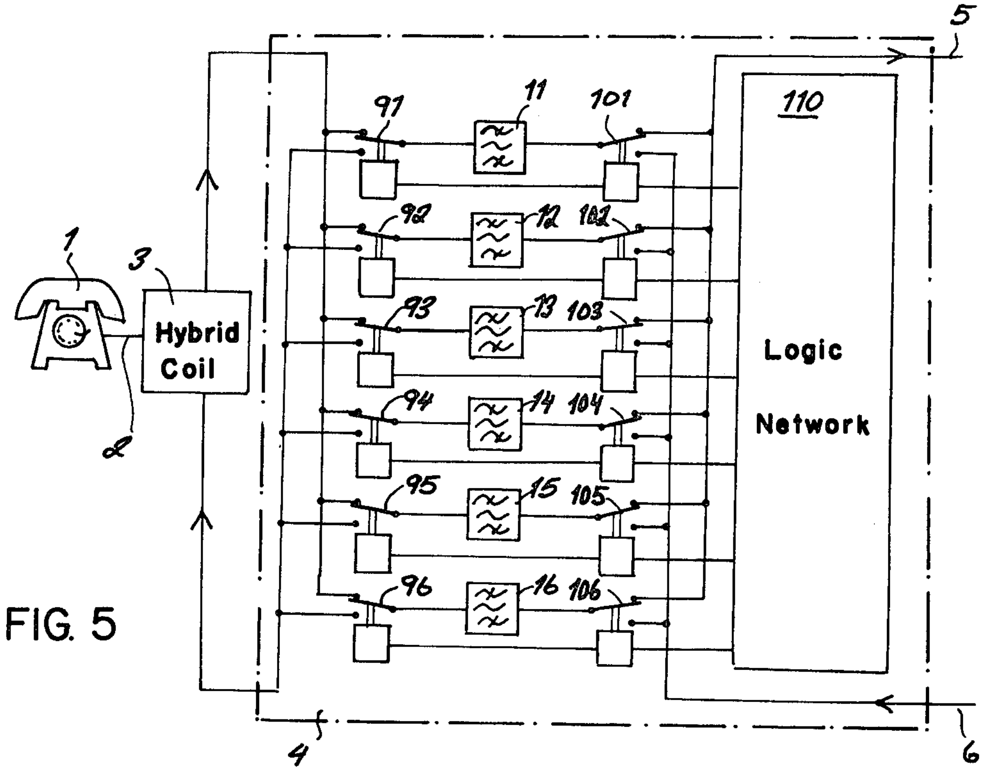
FIG. 5 is a circuit diagram for a single set of band-pass filters.

In FIG. 5 there is shown by way of example a system of this type comprising a single set of band-pass filters 11, 12, 13, 14, 15, 16. Pairs of relay contacts 91, 101, 92, 102, 93, 103, 94, 104, 95, 105, 96, 106 serve to switch each filter from one channel to the other, according to criteria provided by a logic circuit 110 which controls the associated relays 191—192 and 201—206. In the operation of the echo delay time with respect to the original signal is taken into account. The system of FIG. 5 corresponds otherwise to that of FIG. 3.

I claim:

1. In a telecommunication system comprising a local line, an incoming signal path, an outgoing signal path, and a coupling network operatively interconnecting said line for the transmission of signals within a predetermined frequency band between a local station and a remote station, the combination therewith of:

a multiplicity of band-pass filters connected in parallel in said outgoing path for selecting different subbands within said frequency band for transmission between said stations;

a multiplicity of switch means respectively inserted in series with said filters for selectively blocking the transmission of said subbands over said outgoing path; and detector means connected to said incoming path for ascertaining the predominance of signal energy in certain of said subbands and controlling said switch means to block transmission of the last-mentioned subbands over said outgoing path.

2. The combination defined in claim 1, further comprising a multiplicity of second band-pass filters connected in parallel in said incoming path between said detector means and said coupling network, and a multiplicity of second switch means respectively inserted in series with said second filters for selectively blocking the transmission of subbands other than said last-mentioned subbands from said incoming path to said local line.

3. The combination defined in claim 2 wherein said incoming path is normally open-circuited in the vicinity of said coupling network, said second switch means being associated with respective switch means of the first-mentioned multiplicity to form pairs of switches operable to connect the associated filter in said incoming path upon blocking the transmission of its subband over said outgoing path, thereby facilitating selective reception of the corresponding subband by said local line.

4. The combination defined in claim 3, further comprising monitoring means connected to both said paths for ascertaining the concurrent presence of different frequencies therein, indicative of two-way communication over said paths, said detector means being responsive to said monitoring means for operating said switch means to block any of said subbands only in the event of said concurrent presence.

5. The combination defined in claim 4 wherein said monitoring means comprises a logic network with input connections to said outgoing path beyond said filters and to said detector means.

6. The combination defined in claim 4 wherein said monitoring means comprises band-stop means centered on a predetermined frequency and connected between said incoming path and said coupling network, first frequency-selector means responsive to said predetermined frequency and connected to said incoming path ahead of said band-stop means, and second frequency-selector means responsive to said predetermined frequency and connected to said outgoing path.

7. The combination defined in claim 6 wherein said second frequency selector means is connected to said outgoing path ahead of said filters.

8. The combination defined in claim 1 wherein said detector means comprises a set of parallel-connected filters and a set of level detectors connected in the outputs of said filters.

9. In a telecommunication system comprising an incoming signal path for the transmission of signals from a remote station to a local station, the combination therewith of a multiplicity of band-pass filters connected in parallel in said path for selecting different subbands within a band of frequencies to be transmitted, a multiplicity of switch means respectively inserted in series with said filters for selectively blocking the transmission of their respective subbands to said local station, and detector means connected to said incoming path ahead of said filters and of said switch means for ascertaining the predominance of signal energy in certain of said subbands and controlling said switch means to block transmission in the remaining subbands, thereby reducing noise accompanying an incoming signal.